United States Patent [19]

Meade

[11] Patent Number: 4,657,767

[45] Date of Patent: Apr. 14, 1987

[54] SPRAY DRYING APPARATUS AND METHOD

[75] Inventor: Reginald E. Meade, Tulare, Calif.

[73] Assignee: Dairyman's Cooperative Creamery Assoc., Tulare, Calif.

[21] Appl. No.: 795,935

[22] Filed: Nov. 7, 1985

[51] Int. Cl.[4] .......................... A23C 1/05; F26B 3/08
[52] U.S. Cl. ...................................... 426/471; 34/10; 34/57 A; 34/57 R; 426/294; 426/453; 426/467
[58] Field of Search .............. 426/471, 453, 467, 294; 34/10, 57 A, 57 R, 164, 82, 85

[56] References Cited

U.S. PATENT DOCUMENTS

3,554,760  1/1971  Sienkiewicz .................. 426/453
4,490,403 12/1984  Pisecky et al. ................ 426/471

Primary Examiner—George Yeung
Attorney, Agent, or Firm—Flehr, Hohbach, Test Albritton & Herbert

[57] ABSTRACT

Apparatus and method for manufacturing a dry product in the form of granular aggregates from liquid source materials such as may be selected from the group consisting of dairy whey in unmodified or modified forms, non-fat and fat containing dairy milk and mixtures thereof, the method making use of a spray drying together with pulsed filter membranes.

9 Claims, 6 Drawing Figures

SPRAY DRYING APPARATUS AND METHOD

This invention relates generally to apparatus and methods for producing dried particulate products.

Reference is made to my co-pending application Ser. No. 654,958, now U.S. Pat. No. 4,561,192, which is a continuation-in-part of my co-pending application Ser. No. 445,051 filed Nov. 29, 1982 which discloses certain subject matter disclosed herein, now abandoned.

Spray drying methods and apparatus are commonly used in a wide variety of industries for producing dried particulate or powder products. For example in the dairy industry spray dryer equipment and methods are used for converting liquid milk or whey to dry powder form. The composition of some materials includes substances tending to impart stickiness during drying, which may destroy their desired identity. In some instances such stickiness or tackiness may be attributed to the presence of a substantial amount of moisture, while in other instances it may be due to the presence of substances such as sugars, fats, oils, waxes, gums, proteins, or other viscous, sticky materials.

Conventional spray drying methods operate in such a manner and under such conditions that the bulk of the resulting product consists of hollow spheres or sphere fragments. U.S. Pat. No. 2,835,586 to Peebles, dated May 20, 1958, discloses a process in which such anhydrous spray dried particles of dairy milk are dispersed in an agglomerating chamber where moisture is added to cause the particles to become sticky. Random contacts of the sticky particles causes the formation of porous aggregates. Thereafter the porous aggregates are dried to form products that are readily dispersible in water. Such agglomerated products may have a bulk density of the order of 150 to 300 grams per liter, the low density being due in part to the porous nature and size of the agglomerated porous granules, and in part to the low density of the spray dried particles.

The Peebles process is applicable primarily to spray dried particles produced from liquid dairy products, such as liquid whey and liquid milk, and is not applicable to a wide variety of products such as are found in the pharmaceutical and chemical industries. In addition the Peebles apparatus and method requires redrying and thus is not as economical as is desired, with reference particularly to direct costs of energy consumption and capacity.

As disclosed in Voorhies U.S. Pat. No. 1,874,665, Aug. 30, 1932, screens or filter membranes are incorporated in spray drying apparatus whereby substantial amounts of the atomized material are caused to deposit on screens. The screens are periodically shocked for the purpose of dislodging accumulated material. Such equipment and method is subject to the disadvantage that the end product which includes material dislodged from the screens, may not be uniform with respect to physical form and moisture content, due to the fact that material dislodged from the screens may vary with respect to physical form and moisture content. Also such equipment is difficult to maintain in clean and sanitary condition, and requires frequent shutdown for maintenance and cleaning. Removal of solid particles from the exhausting air is relatively inefficient, and the filtering capacity is such that it restricts the overall operating capacity of the dryer.

Another spray dryer apparatus and method is disclosed in U.S. Pat. No. 3,615,723, Oct. 26, 1971. In that instance partially dried atomized material is deposited as a porous mat upon a foraminous belt which moves across the lower portion of the spray dryer chamber. Drying air from the main drying chamber is caused to pass downwardly through the deposited mat, thus removing additional moisture. The mat on the conveyor is subjected to further drying after it is carried out of the spray drying chamber, and may then be subjected to cooling, after which it is crushed to form the desired particulate dry product. With this apparatus and method the material being deposited upon the foraminous conveyor belt has sufficient moisture and stickiness to form the desired porous mat. There is considerable resistance to the flow of drying medium through the deposited mat upon the conveyor belt, which is a limiting factor of the capacity obtained for a particular size of equipment. Some relatively fine powder material which may be deposited upon the conveyor belt may be enmeshed in the moist mat and thus incorporated as fines in the final product. Fine powder separated from the crushed material may be introduced into the main drying chamber and thus recycled.

Meade in U.S. Pat. No. 2,661,294 issued Dec. 1, 1953 discloses a method of drying lacteal fluids (e.g. whey) having a substantial amount of lactose, by crystallization 50% or more of the lactose content in the form of fine particles of lactose monohydrate and then spray drying the material without removing water of crystallization or resolution of the crystallized lactose.

It is an object of the present invention to provide a spray drying apparatus and method which is applicable to a wide variety of fluid feed materials, including materials which tend to become sticky or tacky during drying.

Another object is to provide a spray drying apparatus and method which is relatively efficient with respect to energy consumption, and has relatively high capacity for equipment of a given size.

Another object is to provide an apparatus and method which requires a minimum amount of auxiliary equipment, such as separating cyclones.

Another object is to provide a method which produces discrete dry products in the form of granular agglomerates of relatively high density. The granular agglomerates are characterized in that they consist of relatively dense spherical shaped particles that are bonded together.

In general the present invention makes use of apparatus consisting of a generally horizontal main drying chamber having duct means for receiving a drying gas such as hot air. Means is provided for introducing the fluid feed material in atomized form into one end portion of the chamber together with the drying gas, such as hot air, whereby the atomized droplets are dispersed in the drying gas to effect preliminary drying. The drying conditions are such that the bulk of the discrete moist particles produced are relatively dense and spherical shaped. A secondary drying unit, preferably of the fluidized bed type, extends across and forms the lower end of the main chamber, whereby the coarser partially dried particles progressing downwardly from the main drying chamber are received by the secondary drying unit. Finer moist particles carried by the drying gas being removed from the chamber are separated out by filter means comprising fabric filter membranes that are periodically pulsed to dislodge cumulated material. As particles are deposited on the filter membranes, they adhere together as a porous agglomerated mass and are subjected to further drying by air entering the filter. When dislodging from the filter membranes, fragments of the agglomerated material are intermingled with freshly introduced moist material and deposited on the secondary drying unit.

Further features and objects of the invention will appear from the following description in which the preferred embodiment has been set forth in detail in conjunction with the accompanying drawing.

REFERRING TO THE DRAWING

Figure 1:
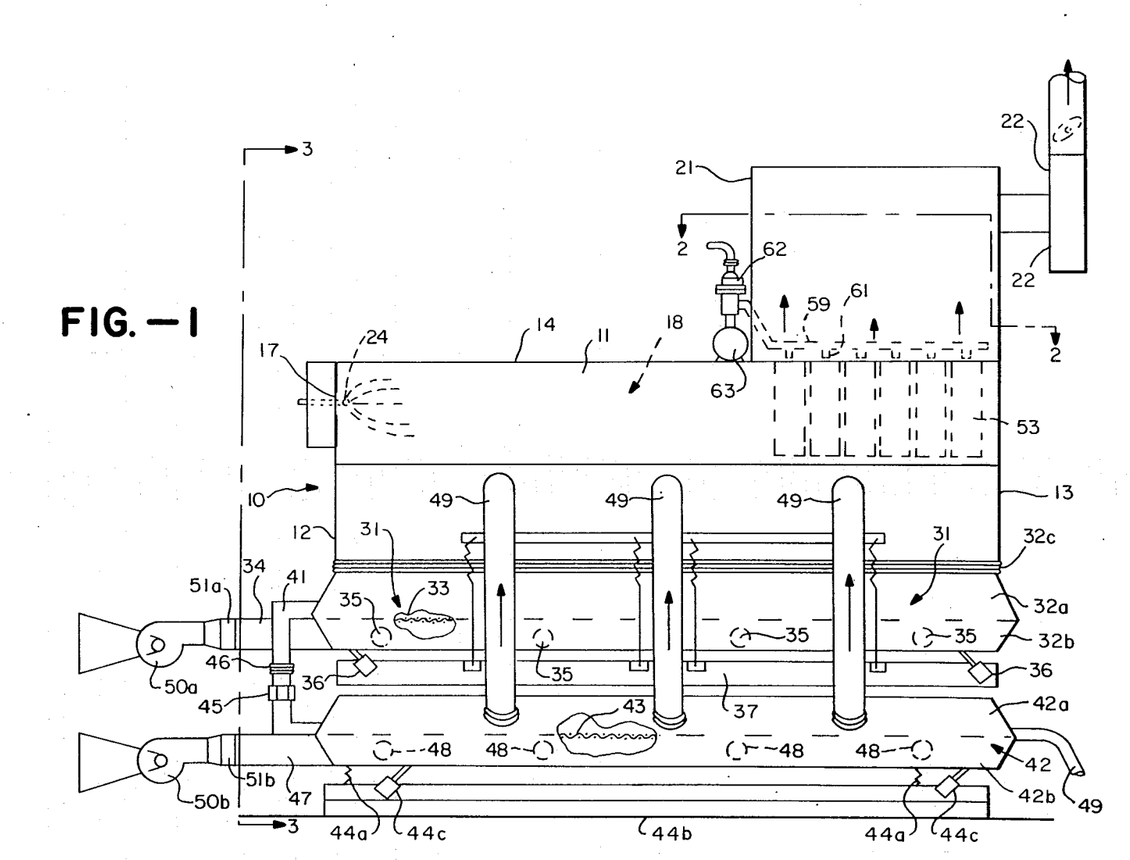
FIG. 1 is a side elevational view schematically illustrating apparatus in accordance with the present invention.
Figure 2:
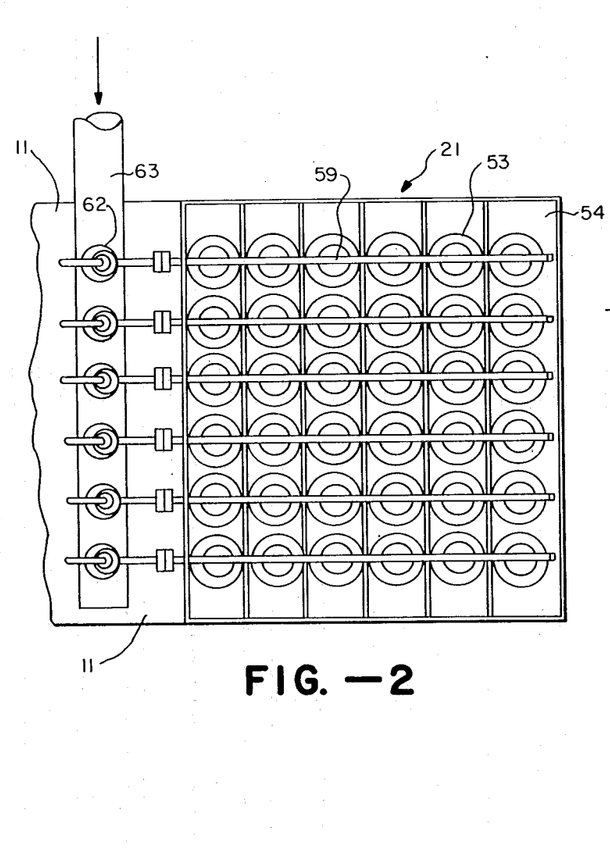
FIG. 2 is a view taken along the section line 2—2 of FIG. 1.
Figure 3:
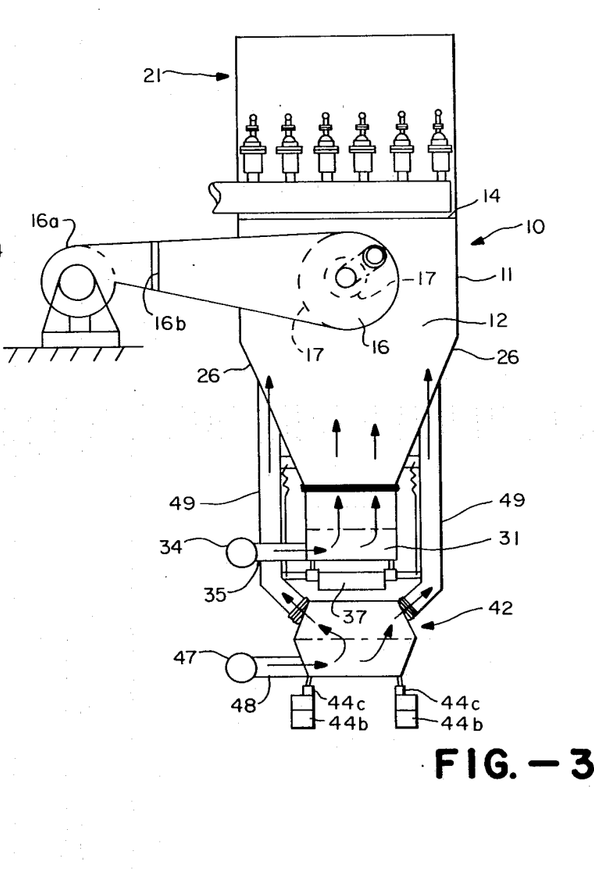
FIG. 3 is a view looking toward the left hand end of FIG. 1, as indicated by line 3—3 of FIG. 1.

The apparatus illustrated in the drawings consists of a structure 10 formed of upright side walls 11, upright end walls 12 and 13, and the top wall 14. A duct 16 is mounted upon the end wall 12, and communicates through opening 17 (FIG. 3) with the interior main drying chamber 18. The structure 10 is extended horizontally substantially as illustrated. The duct 16 communicates with suitable means for supplying a drying gas, such as hot air. In a typical instance this means can consist of a blower 16a and conventional air heating means 16b. Air so introduced into one end of the chamber 18 through the duct 16 is caused to flow across the upper region of chamber 18, and is exhausted through the plenum extension 21, which extends across the upper wall of the structure at that end remote from the duct 16. A blower 22 is shown for the discharge of air from the extension 21. Atomizing means 24 is located centrally of the opening 17 whereby fluid feed supplied to atomizing means serves to atomize the feed and to cause the atomized droplets to be dispersed in the stream of drying air introduced through the opening 17. With this arrangement atomized droplets are subjected to partial drying in the upper part of the chamber 18, with some finer partially dried material being carried toward the remote end of the chamber, and other partially dried heavier material gravitating downwardly into a lower portion of chamber 18.

The atomizing means 24 may consist of one or more nozzles supplied with the fluid feed under pressure. However, atomizing means of the spinning disc type is preferred.

The lower part of the structure 10 is formed by the convergent side walls 26, which in effect form a trough extending horizontally from one end of structure 10 to the other end.

The lower trough-like open end of the structure 10 directly communicates with a drying unit 31 which is of the fluid bed type. Commercial units of this type normally have the space above the screen enclosed by a hood or dome. The unit shown consists of a housing having upper and lower parts 32a and 32b, the upper part 32a being coupled to the lower end of the structure 10 by flexible sealing means 32c. Also it is open, or in other words, the space within the upper part is unobstructed and open to the lower end of structure 10 for the entire length thereof. Within the housing there is a screen 33 which is mounted between the parts 32a and 32b, and extends for the length of the unit. Air supply conduit 34 communicates with the lower part 32b of the housing by way of ducts 35, whereby hot air or other drying gas is caused to flow upwardly through the screen 33. Vibration imparting actuators 36 impart vibrating movements to the unit and are secured to the housing of unit 31 and also to the weighted counterbalance frame 37. The vibrating arrangement in this instance is such that a fluidized bed of discrete material on the screen 33 is continuously progressed toward the discharge end, which in this instance is the left hand end of the unit 31, which corresponds to that end of the structure 10 in which the fluid feed material is supplied to the atomizing means 24. Duct means 41 shown at the left end of the unit 31 in FIG. 1, provides for the discharge of material from the fluidized bed.

In the particular embodiment illustrated in FIG. 1 of the drawing, the material discharging from the unit 31 is delivered to the feed end of an underlying unit 42, which is likewise of the fluid bed type. The housing of this unit likewise is in upper and lower parts 42a and 42b, with a screen 43 interposed between these parts. The unit may be supported by springs 44a that are seated on the fixed supports 44b, and is vibrated by the actuators, 44c. The discharge duct 41 from the unit 31 communicates with the feed end of the unit 42, through the duct 41, and the connecting flexible couplings 46. A device 45 may be inserted in duct 41 to break up lumps. It may be a simple rotary impact device or a crushing mill that employs crushing rolls. Conduit 47 communicates with the lower housing part 42b and serves to supply a treatment gas (e.g. hot air) which flows through ducts 48 and then upwardly through the screen 43 and the fluidized bed of material. One or more of these ducts 48 near the discharge end of unit 42 may supply cooling air from a separate source to cool the material before it is discharged. Conduits 49 which communicate with the upper housing part 42a, serve to discharge the drying gas leaving the fluidized bed. They are shown connecting with the main chamber through the sloped walls 26. Particulate material of the fluidized bed in the lower unit 42, progresses toward the right and is discharged through the discharge duct means 49. Fine particulate material carried with the air discharged from unit 42 through ducts 49, is delivered into the main chamber for mixing with the downwardly progressing material from the main spray drying chamber, together with fine particulate material carried upwardly from the fluidized bed of unit 31.

Blowers 50a and 50b are shown for supplying drying air or other gas to the conduits 34 and 47. Also heaters, together with flow control dampers 51a and 51b are shown for supplying the drying air at optimum temperatures and flow rates.

Figures 4, 5, 6:
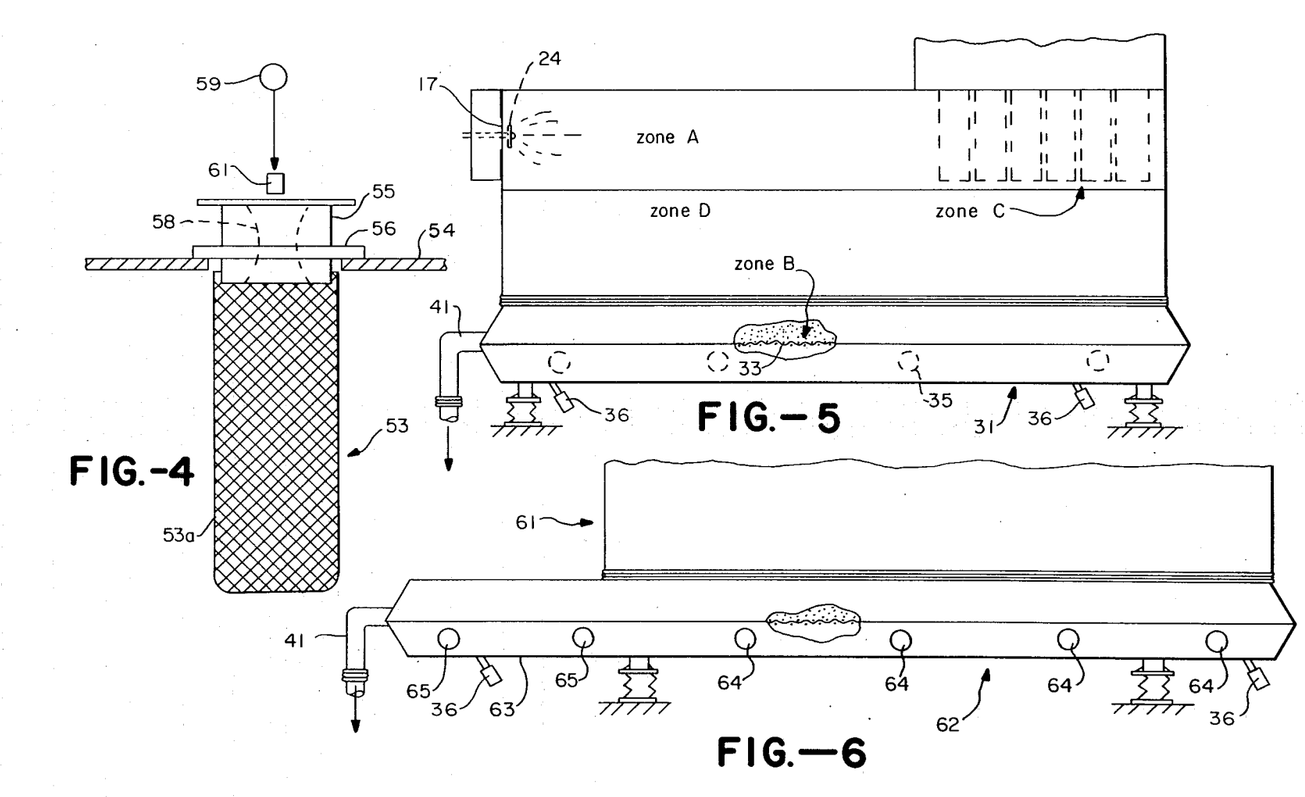
FIG. 4 is a schematic view showing a single filter unit together with pneumatic pulsing means.
FIG. 5 is a schematic side elevation showing the several drying zones.
FIG. 6 is a fragmentary view in side elevation showing another embodiment.

The apparatus as described above incorporates certain features disclosed and claimed in co-pending U.S. application Ser. No. 445,051, filed Nov. 29, 1982. The present invention employs, with the above described apparatus, filter means of the pneumatically pulsed type. The filter means comprises a plurality of filter units 53 carried by a tube plate 54 that is interposed between the chamber 18 and the interior of the extension 21. Preferably the filter units are of the bag type as shown in FIG. 4. Thus the filter membrane of each unit 53 is a fabric bag 53a having its upper end secured to a 
head 55 and its lower end closed. A flange 56 secured to the head is carried by the plate 54 and secured thereto by bolts or other suitable means. The passage through each head preferably is a venturi pasage 58.

A pipe 59 overlies each row of filter units and is provided with discharge nozzles 61, each of which is aligned with the venturi 58 of an underlying filter unit so that it discharges into the venturi passage of the head. Pipes 59 connect with solenoid operated valves 62, which connect with a manifold pipe 63 that is supplied with air under pressure. An electrical programmed unit (not shown) serves to actuate the valves in a predetermined manner. For example, the valves may be actuated to open and close in timed sequence.

As is conventional practice with bag type filters, the fabric bags surround a core formed, as by longitudinal flutes or spaced rods to support the bag on circumferentially spaced areas when the bag is collapsed against the core by differential flow pressure. During a filtering cycle, flow from the surrounding medium causes the bag to be pressed against the core with some inward defection of the fabric in areas between regions supported by the core. When pneumatically pulsed, the areas of the fabric that were previously flexed inwardly are flexed outwardly to dislodge the material collected on its outer surface during the filtering period.

With respect to the fabric employed for the filter units, it should have a porosity such that it effectively separates the fine particles carried by the air flow with minimum flow resistance. Also it should effectively slough off accumulated material by outward flexing when pneumatically pulsed. Of the various filter fabrics that have been tested, best results have been attained with fabric of the felted/woven type, with permeability above 50 SCFM at 0.5 in W.G. $\Delta$p. Such a fabric is one identified as PE39 which consists of 8 ounce polyester fabric felt, calendered, heat set on one side, and manufactured by Bag House Associates, Kansas City, Mo. Other monofilament polyester and nylon fabrics can be used, if woven with relatively high permeability above 50 SCFM, (standard cubic feet per minute).

Operation of the apparatus to carry out the present method involves control of spray drying initially to produce the previously described dense particles having a moisture content such that they are discrete but with moist surfaces that are sticky or adherent, whereby when the dispersed particles are caused to effect random contact, they adhere together in the form of porous aggregates. In general this involves maintaining the solids content and rate of the feed at a compatible value, and controlling processing factors such as the temperatures of the drying air supplied to the main chamber, the rate of air flow into the main drying chamber, and the general size of the droplets produced by the atomizing means. Optimum values for apparatus of a particular size and for a particular feed material, to produce the desired dense moist particles, can be readily determined by trial runs.

Assuming that the apparatus is in operation and that the feed material is concentrated liquid dairy whey, the droplets from the atomizing means are dispersed in the drying air in the region between the atomizing means and the filter units, and extending downwardly toward the fluidized bed on screen 33. In schematic FIG. 5 this is designated zone A. Also in this figure a single fluidized bed unit is shown. In zone A, moisture is removed from the droplets at a substantially constant rate to produce discrete particles that have moist adherent surfaces. From that zone the discrete material progresses downwardly by gravity into zone B, which is the active fluidized bed of material on screen 33. Some finer particulate material is carried by upward air flow from zone B into zone A, where it mixes with the discrete but moist material produced in the region of zone A. Such intermixture takes place in a region between zones A and B. Further removal of moisture takes place in zone B, but at a falling or decreasing rate. As the result of substantially constant rate drying in zone A, both the coarser and finer particles have moisture contents of the order of 6 to 12% (total), whereby their moist surfaces are adherent or sticky. Random contacts between particles in zone A causes formation of moist agglomerates, the aggregates comprising adhered moist discrete particles as initially formed by spray drying and some finer particles that are carried upwardly by air flow from the fluidized bed. Some particles, including both agglomerated and unagglomerated material, are carried by air flow into zone C of the filter bags and is deposited on the filter membranes. Such material is separated from the air flow and deposited on the fabric filter bags during periods when the units are not being pulsed. The material accumulating on the filter fabrics form porous layers comprising particles adhered together in the form of porous aggregates. While on the fabric bags, the material is subjected to some further agglomeration and further drying by virtue of drying air flowing through the same. During the short pulsing time of a unit, the bag is flexed and expanded by reverse pressure differential whereby the accumulated and agglomerated material is dislodged to fall by gravity into the region underlying the filter zone C. Such material consists of agglomerated fragments of varying sizes. Some of this material becomes dispersed in the drying air in zones A and D to co-mingle with the moist material descending by gravity from zone A and which eventually enters the fluidized bed of material in the secondary dryer 31. Also, some material may fall from the filter bags and be deposited upon that portion of the fluidized bed underlying the filters. Co-mingling of material in zone A and in the fluidized bed provides some attention to break up some oversize fragments removed from the filter units and to produce a product that is relatively homogenous with respect to size of the agglomerated granules and bulk density. As previously mentioned, the product may be further dried in the unit 42.

Further with reference to dislodgement of material from the filter membrane, reduction in moisture content of the material deposited on the membrane, by evaporation, serves to reduce the adhesive or sticky character of the material, particularly when the material has one or more crystallizable components, such as lactose, that is subject to further crystallization on the filter membrane. This tends to promote dislodgement of such materials when the membrane is flexed by the pulsing action.

For typical operations the pressure drop across the fabric bags of the filter units should not exceed about five inches water column. With respect to pulsing of the filter units, good results were obtained by using a sustained pulsing period of 0.1 to 0.2 seconds, with a filtering period of 15 to 90 seconds between pulses.

Schematic FIG. 5 indicates the regions of the zones A, B, C and D, referred to above. The upper part of zone A extends between the atomizer and the filter zone C. The lower mixing zone D, extends to the fluidized bed zone B which extends for the full length of the dryer. The filter zone C receives material from both zones A and D.

As shown in FIG. 5, the fluidized bed dryer 42 may be omitted provided the fluidized bed unit 31 has adequate size and drying and cooling capacity to produce a final product of the desired low moisture content. Also in the event unit 31 is lacking in capacity, the temperature of the drying gas and flow rates may be adjusted to enable the single fluidized bed unit 31 to produce a final product of the desired moisture content. In other installations a suitable secondary dryer can be employed for finish drying, such as a separately installed fluid bed dryer that has a cover over the screen. The space over the fluid bed may be connected by one or more conduits with the mixing zone D, to return fine particulate material.

The modification of FIG. 6 employs a fluidized bed unit 62 which has an extension 63 at one end. Drying air is supplied to ducts 64 and cooling air to the ducts 65 of the exterior portion of the unit.

The invention is deemed applicable to feed materials which can be spray dried to form dense particles that are sticky at a point in the drying cycle at which the particles have a substantial moisture content (e.g. 6-12%). Particular reference can be made to that group of products comprising whey products in modified or unmodified forms, non-fat and fat containing dairy milk, and mixtures thereof. Modified whey includes whey from which some or most of the lactose has been removed, and deproteinized whey. Examples of non-dairy products include fruit and vegetable juices (e.g. citrus juices), sugar (e.g. sucrose) solutions that may contain other dispersed solid components of vegetable origin, and solutions of dextrins or lactose, or mixtures thereof. Also the invention is applicable to a class of materials consisting of emulsions containing high amounts of fats or oils (up to 90% or more) such as powdered butter or cream, powdered shortenings, cheese, spreads, dips, etc. The fat content of such materials provides cohesion. Generally stated, the material being dried can consist of a single substance in solution or dispersed solid form, or mixtures of such substances. However it must include as a component a non-volatile material which is rendered tacky or sticky or cohesive at some point during removal of the liquid solution or dispersing liquid medium. The stickiness should be such as is capable of forming adhesive connections between the dense spherical particles, which in the final dried product firmly bonds the particles together in granular porous aggregates.

In instances where it is desired to decrease the bulk density of the final dried product, a gas can be continuously introduced into the liquid feed to effect a controlled degree of aeration. This serves to increase the volume of the final product. Also it serves to produce an agglomerated product that is cellular in character.

An example of the invention is as follows.

The structure 10 was fabricated to provide a chamber 18 about 36 feet long between the end walls 12 and 13. The height of the structure between the top wall 14, and the lower end connected to the dryer unit 31, was about 30 feet. The dryer unit 31 was of the fluidized bed type, and the additional dryer unit 42 was of the same type. The filter units were arranged in rows, the total number of bags or tubes being 430. Separate pulsing valves 62 were used to control the pulsing of the filter units, and the electrical circuitry for actuating the valves 62 was set to pulse the rows successively, the pulsing period being 0.2 seconds, and the filter period between pulses being 60 seconds. Drying air at a temperature of about 320° F. was introduced into the drying chamber from duct 16, at a flow rate of about 45,000 standard cubic feet per minute. The discharge plenium 21 was connected to the suction side of blower 22. The pressure drop across the fabric of each filter unit during a filter cycle, averaged about 4.0 inches water column. Pasteurized whey having a solids content of about 52%, at a temperature of about 160° F. was supplied under pressure to the atomizer 24, to produce a spray of dense droplets which were dispersed in the drying air and eventually deposited in Unit 31 at a moisture content of 8-10%. Air at a temperature of about 225° F. was also supplied to the conduits 34 and 47 at the rate of about 11,500 SCFM, and this air together with vibration of the unit 31 maintained a fluid bed above the screen 33 averaging about 4 inches in depth. The material discharging from the left hand end of unit 31 as viewed in FIG. 1, was delivered to the feed end of the unit 42 at a moisture content of about 5-6%. The additional 15,000 SCFM air from duct 47 dried the whey discharging from unit 42 to a moisture content of about 3.0%. This material was then processed in sizing equipment whereby the size of the granules was of the order of about 0.10 to 0.75 inches. The granules were in the form of aggregates made up of spherical shaped dense particles bonded together. The bulk density of this material was about 300 grams per liter. By way of comparison, an instantized agglomerated product consisting of whey solids made in accordance with Peebles U.S. Pat. No. 2,835,586, has a density of about 150 grams per liter. The difference in the density between such two products is attributed to the fact that when made in accordance with the present invention, the particles making up the agglomerated granules are of themselves relatively dense, as distinguished from the lighter individual particles of agglomerated granules made in accordance with the Peeblers process, which are in the form of hollow or broken spheres. When the agglomerates of the subject product were disintegrated by crushing the bulk, density was increased. The capacity of the equipment was relatively high, being about 8,000 pounds of dry whey per hour. The energy consumption was relatively low, being about 100 KWH (kilo watt hours) per ton of processed product. This included the small amount of auxiliary equipment employed, namely a cyclone to which the product was pneumatically conveyed and a sizing mill for processing the tailings from the cyclone, before recycling such material to the fluidized bed of unit 31.

Whey products, non-fat dry milk, buttermilk or other lacteal materials dried in accordance with the foregoing example are relatively non-hydroscopic, or in other words, they are stable with respect to atmospheric moisture. With lacteal materials having a substantial lactose content, the major portion of the lactose in the dry product is in the form of crystalline alpha monohydrate.

Attached Table No. 1 gives data concerning certain test runs of the apparatus and methods, which processed sweet whey, whey protein concentrate, buttermilk, and non-fat dry milk (NDM). Attached Table No. 2 gives physical characteristics of the products produced in these runs.

The testing procedures for values other than bulk density in Table No. 2 were methods described and published by the American Dry Milk Institute, Inc., 130 North Franklin Street, Chicago, IL 60606, the publication being Bulletin 916 (revised 1971) entitled "The Standards for Grades of Dry Milk Including Methods of Analysis."

The methods used to determine bulk density were as follows: By placing a sufficient amount of sifted particles to fill a 250 milliliter graduated cylinder to a volume of 200 milliliters. Loose bulk densities were determined by ascertaining the weight of the particles on a 200 milliliter basis (i.e., weight in grams divided by 200 cubic centimeters equals bulk density).

The method used to determine particle density was as follows: Average particle density (grams/cubic centimeters) represents the average particle weight in relation to the volume of the particles. Thus, more porous particles provide a lesser particle density than particles of a lesser porosity. Average particle density of tested material as referred to herein was ascertained by a Beckman Model No. 930 air comparison pycnometer.

Employing the air comparison pycnometer, average particle density is ascertained by the equation:

$$\text{Average particle density (grams/cubic centimeter)} = \frac{\text{Sample weight in grams}}{\text{Instrument reading in cubic centimeters}}$$

The Zone A referred to in Table No. 1 is the zone so identified in FIG. 5.

The runs reported in Tables 1, 2 and 3 were made using the dryer structure described in Example 1. The runs, and data reported in the Tables provide further examples in which sweet whey, whey protein concentrate, buttermilk, and non-fat dry milk were processed to produce dry products. The dry buttermilk was deemed unique with respect to its protein content, which was readily soluble in water. So far as applicant is aware, dry buttermilk being made by other methods has a protein content that is dispersible but relatively insoluble in water.

TABLE NO. 1

LACTEAL PRODUCTS PRODUCED BY SUBJECT PROCESS
PERCENTAGES CRYSTALLIZED LACTOSE, MOISTURE CONTENT (M.C.), ETC.
PERCENTAGES MOISTURE CONTENT
FOR PRODUCTS MADE BY VARIOUS METHODS

| DRIED PRODUCT AND METHOD USED | % TOTAL LACTOSE IN PRODUCT M.C. OF HYDRATE | M.C. BY TOLUENE DISTILLATION PRIMARY ZONE | FINAL DRYING | M.C. 65° C. VACUUM OVEN FINAL DRYING | (%) M.C. AS ALPHA LACTOSE MONO- HYDRATE | HYGRO-[2] SCOPICITY |
|---|---|---|---|---|---|---|
| SWEET DRY WHEY | 72.0% M.C. 3.6% | 9.40 | 5.42 | 1.91 | 3.51 (97.5%) | 6.4 |
| WHEY PROTEIN CONCEN-[1] TRATE | 48.0 2.4 | | | | | |
| LOW M.C. IN PRIMARY ZONE A | | 5.37 | 3.93 | 3.83 | 0.10 (4.2%) | 13.1 |
| HIGH M.C. IN PRIMARY ZONE A | | 9.12 | 4.46 | 2.63 | 1.83 (76.3%) | 4.8 |
| BUTTERMILK | 50.0 2.5 | | | | | |
| LOW M.C. IN PRIMARY ZONE A | | 6.55 | 3.66 | 3.22 | 0.44 (17.6%) | 15.1 |
| HIGH M.C. IN PRIMARY ZONE A | | 9.17 | 4.89 | 3.60 | 1.29 (51.6%) | 9.9 |
| NON-FAT DRY MILK SINGLE DRYING UNIT 31 | 52.0 2.6 | 3.2 | 3.2 | 3.05 | 0.15 (6.0%) | 16.6 |
| NON-FAT DRY MILK | 52.0 2.6 | | | | | |
| LOW M.C. ZONE A | | 6.83 | 2.50 | 2.39 | 0.11 (4.2%) | 15.8 |
| HIGH M.C. ZONE A | | 9.15 | 5.09 | 3.26 | 1.83 (70.4%) | 10.6 |

*[1] Prepared by ultrafiltration of cheese whey to produce protein concentrate fraction.
*[2] Hygroscopicity - final moisture content after exposure to humid air under prescribed conditions. See publication Analytical Methods For Dry Milk products by A/S Niro Atomizer, fourth edition, 1978.

TABLE NO. 2

PHYSICAL CHARACTERISTICS OF LACTEAL PRODUCTS THAT MAY BE
AFFECTED BY SUBJECT DRYING METHOD

| DRY PRODUCT IDENTIFICA- TION | SOLUBILITY INDEX (1) | SCORCHED PARTICLES (1) | DISPERSIBILITY OF DRY PRODUCT (1) | BULK DENSITY (2) | PARTICLE DENSITY (3) |
|---|---|---|---|---|---|
| WHEY PROTEIN CONCENTRATE | | | | | |
| LOT 2371A | 0.1 | <disc B | NA | 0.393 | 1.28 |
| LOT 706H | 0.2 | <disc B | | 0.314 | 1.20 |

TABLE NO. 2-continued
PHYSICAL CHARACTERISTICS OF LACTEAL PRODUCTS THAT MAY BE AFFECTED BY SUBJECT DRYING METHOD

| DRY PRODUCT IDENTIFICATION | SOLUBILITY INDEX (1) | SCORCHED PARTICLES (1) | DISPERSIBILITY OF DRY PRODUCT (1) | BULK DENSITY (2) | PARTICLE DENSITY (3) |
|---|---|---|---|---|---|
| BUTTERMILK | | | | | |
| A. LOT 44 | 0.1 | disc A | 94.2 | 0.628 | 1.35 |
| C. LOT 44 | <0.1 | disc A | 92.9 | 0.633 | 1.37 |
| A. LOT 46 B. | | | | | |
| NDM DRYER 6 T-66 C-7/6/85 | 0.3 | disc A | 96.9 | 0.640 | 1.32 |
| NDM DRYER 4 SINGLE STAGE DRYING | 0.2 | disc A | 71.3 | 0.495 | 1.05 |
| DRY SWEET WHEY DRYER 6.09/26 | 0.1 | disc A | 98.6 | 0.646 | 1.40 |

(1) See page 17, paragraph 3, for reference to analytical methods.
(2) See page 17, paragraph 4, for reference to analytical methods.
(3) See page 17, paragraph 5, for reference to analytical methods.

TABLE 3
FABRIC FILTER PERFORMANCE PRESSURE DROP (Δp) AT VARIOUS AIR VOLUMES RATE AND AIR CLOTH RATIOS (A/C) FOR VARIOUS PRODUCTS USING 430 FILTER BAGS EACH 5" IN DIAMETER, 12' LONG TOTAL FACE AREA 6,754 SQ. FT.

| PRODUCT DRIED % SOLIDS IN FEED | SPRAY DRYING ZONE SCFM | FLUID BED ZONE SCFM | TOTAL SCFM | A/C RATIO SCFM | Δp ACROSS FILTER INCHES W.G. | RELATIVE STABILITY |
|---|---|---|---|---|---|---|
| DRY SWEET WHEY (50–55%) | 55,000 | 25,000 | 80,000 (or more) | 11.84 | 4.5–5.5 | Stable |
| | 40,000 | 25,000 | 65,000 | 9.62 | 3.5–4.0 | Stable |
| WHEY PROTEIN CONCENTRATE (35–40%) | 55,000 | 25,000 | 80,000 | 11.84 | 5.0–6.5 | Marginal |
| | 40,000 | 25,000 | 65,000 | 9.62 | 4.0–5.0 | Stable |
| NDM (35–38%) | 55,000 | 25,000 | 80,000 | 11.84 | 10+ & Up | Rapidly Unstable |
| | 40,000 | 25,000 | 65,000 | 9.62 | 9–10+ | Unstable |
| | 30,000 | 20,000 | 50,000 | 7.40 | 5–6.0 | Stable |
| DRY BUTTERMILK (30–38%) | 55,000 | 25,000 | 80,000 | 11.84 | 10+ & Up | Rapidly Unstable |
| | 40,000 | 25,000 | 65,000 | 9.62 | 9–10+ | Unstable |
| | 30,000 | 20,000 | 50,000 | 7.40 | 5–6.5 | Stable |

For product data and characteristics, see Tables 1 and 2.

What is claimed is:

1. A method of producing discrete dried material from liquid food materials containing solid constituents, the method making use of a horizontally extended chamber having means for introducing and removing drying gas from the same and means for introducing liquid feed material in atomized droplet form into a region adjacent one end of the chamber, the method comprising:

a. spraying atomized droplets of the liquid food material in one portion of the chamber;

b. causing the droplets to be dispersed in the drying gas to effect evaporation of moisture in an initial spray drying zone whereby a dispersion consisting of moist discrete particles having adherent surfaces is formed;

c. causing such moist discrete particles to form moist porous agglomerates by random contact between the particles;

d. causing the agglomerates to progress downwardly by gravity and to merge with a horizontal fluidized bed of agglomerates maintained at the lower end of the chamber;

e. subjecting the agglomerates in the fluidized bed to further drying by passing drying gas upwardly through the bed;

f. exhausting gas from another region of the chamber displaced horizontally from the first named region and adjacent the other end of the chamber and above the fluidized bed;

g. causing the exhausting gas being removed to be directed through filter membranes whereby solids dispersed in the exhausting gas are deposited thereon, the deposited solids comprising some moist particles and agglomerates from said first named region and from the region intermediate said first named region and the fluidized bed;

h. causing the solids as deposited on the filter membranes to effect further formation of agglomerates and to provide deposited layers that are porous and which comprise porous aggregates;

i. cyclically flexing the filter membranes whereby solids collected on the membranes are recurrently dislodged;

g. causing the dislodged solids to be dispersed in the drying gas and to be merged with the fluidized bed; and h. then removing the final product from one end of the fluidized bed.

2. A method as in claim 1 in which drying in said first named region produces both coarse and fine particles having sufficient residual moisture content whereby they are caused to have adherent surfaces, the fine particles being deposited on the filter membranes.

3. A method as in claim 1 in which the fluidized bed extends below both the first named region into which the feed material is introduced in atomized droplet form and said other region of the chamber from which gas is exhausted.

4. A method as in claim 1 in which the liquid food material is selected from the group consisting of dairy whey in unmodified forms, non-fat and fat containing dairy milk, and mixtures thereof.

5. A method of manufacturing a dry product in the form of granular aggregates from liquid feed material selected from the group consisting of dairy whey in modified or unmodified forms, non-fat and fat containing dairy milk and mixtures thereof, the method making use of a structure forming a horizontally extended chamber having means for introducing and removing drying gas from the same, and also having means for introducing liquid feed material in atomized form into a region adjacent one end of the chamber, the method comprising:
   a. spraying atomized droplets of the liquid feed material into one end portion of the chamber;
   b. causing the droplets to be dispersed in the drying gas to effect evaporation of moisture from the same in an initial spray drying zone whereby a dispersion consisting of moist discrete particles having adherent surfaces is formed;
   c. causing such moist discrete particles to form moist porous aggregates by random contacts between the particles;
   d. causing the agglomerates to progress downwardly by gravity and to merge with a horizontal fluidized bed of agglomerates maintained at the lower end of the chamber;
   e. subjecting the agglomerates in the fluidized bed to further drying by passing drying gas upwardly through the bed;
   f. exhausting gas from another region of the chamber adjacent the other end of the same and above the fluidized bed, causing the exhausting gas being removed to be directed through filter membranes whereby solids dispersed in the exhausting gas are deposited thereon;
   g. the deposited solids comprising some moist particles and agglomerates from the initial spray drying region and from the region intermediate the spray drying region and the fluidized bed;
   h. causing the solids as deposited on the filter membranes to effect further agglomeration and to provide deposited layers that are porous and which comprise porous aggregates;
   i. cyclically flexing the filter membranes whereby solids collected on the membranes are recurrently dislodged;
   j. causing the dislodged solids to be dispersed in the drying gas and to be merged with the material of the fluidized bed;
   k. causing the material constituting the fluidized bed to progress toward one end of the same;
   l. removing the product from said one end of the fluidized bed.

6. A method as in claim 5 in which the filter membranes are of the bag type and the membranes are pneumatically pulsed to flex the same.

7. A method as in claim 5 in which drying gas passing upwardly through the fluidized bed caused some fine material to be carried from the fluidized bed into said intermediate region of the chamber, and some to be merged with material deposited on the filter membranes.

8. Apparatus for producing discrete dried material from liquid feed materials that tend to become sticky or tacky during drying, the apparatus comprising:
   a. a horizontally extended structure forming a main drying chamber;
   b. means for introducing a fluid feed material in droplet form into a first upper region of the chamber that is adjacent one end of the structure;
   c. means for supplying a drying gas to said upper region of the chamber, whereby the droplets of the feed material are dispersed in the drying gas to effect drying of the same;
   d. a drying unit of the fluidized bed type enclosing and extending below the lower end of the chamber and open thereto for substantially the horizontal length of the chamber, whereby material progressing downwardly through the main drying chamber is received upon the fluidized bed drying unit;
   e. a plurality of filter units disposed in another upper region of the chamber that is adjacent the other end of the structure, each of said filter units consisting of a filter membrane, the filter membranes of the units being interposed in the flow of gas from the chamber whereby fine particles are deposited upon the filter membranes;
   f. means for periodically flexing the membranes of the filter units whereby deposited fine particles are continually dislodged, the dislodged fine material progressing downwardly and being intermixed with the material from the first region in the fluidized bed unit;
   g. means for supplying drying gas to the fluidized bed unit;
   h. and means for effecting discharge of dried discrete material from one end of the fluidized bed unit.

9. Apparatus as in claim 8 in which the filter units are of the bag type, the membrane of each unit being flexed by pneumatic pulsing means.

* * * * *